(12) United States Patent
Purkis (10) Patent No.: US 11,168,543 B2
(45) Date of Patent: Nov. 9, 2021

(54) OPTICAL FIBRE DEPLOYMENT

(71) Applicant: Well-Sense Technology Limited, Aberdeen (GB)

(72) Inventor: Daniel George Purkis, Dyce (GB)

(73) Assignee: WELL-SENSE TECHNOLOGY LIMITED, Aberdeen (GB)

( * ) Notice: Subject to any disclaimer, the term of this patent is extended or adjusted under 35 U.S.C. 154(b) by 10 days.

(21) Appl. No.: 16/318,299

(22) PCT Filed: Jul. 18, 2017

(86) PCT No.: PCT/GB2017/052114
§ 371 (c)(1),
(2) Date: Jan. 16, 2019

(87) PCT Pub. No.: WO2018/015741
PCT Pub. Date: Jan. 25, 2018

(65) Prior Publication Data
US 2019/0284890 A1      Sep. 19, 2019

(30) Foreign Application Priority Data

Jul. 18, 2016   (WO) ................ PCT/GB2016/052171

(51) Int. Cl.
*E21B 41/00*     (2006.01)
*E21B 47/113*    (2012.01)
(Continued)

(52) U.S. Cl.
CPC .............. *E21B 41/00* (2013.01); *E21B 17/20* (2013.01); *E21B 19/00* (2013.01); *E21B 23/14* (2013.01);
(Continued)

(58) Field of Classification Search
CPC ...... E21B 41/00; E21B 47/113; E21B 47/135; E21B 17/20; E21B 23/14; E21B 19/00;
(Continued)

(56) References Cited

U.S. PATENT DOCUMENTS 3,547,406 A    12/1970  Fowler et al.
4,325,438 A     4/1982  Zuvela
(Continued)

FOREIGN PATENT DOCUMENTS

CA    2252400 A1    10/1997
EP    1854959 A1    11/2007
(Continued)

OTHER PUBLICATIONS

International Search Report PCT/ISA/210 for PCT International Application PCT/GB2017/052114 dated Sep. 27, 2017.
(Continued)

*Primary Examiner* — Michael R Wills, III
(74) *Attorney, Agent, or Firm* — Harness, Dickey & Pierce, P.L.C.

(57) ABSTRACT

A deployable device including a deployable member. The deployable member includes an optical fibre. The deployable member is stowed at the device in a first wound configuration and arranged to be deployed from the device to a second unwound configuration within a well. In examples, the deployable device is configured such that, when unwound, the deployable member has a propensity to adhere to a wall within the well. In examples, the deployable member includes at least a first length and second length, the first and second lengths having different mechanical properties.

19 Claims, 6 Drawing Sheets

(51) Int. Cl.
  *E21B 47/135* (2012.01)
  *E21B 17/10* (2006.01)
  *E21B 23/14* (2006.01)
  *E21B 19/00* (2006.01)
  *G02B 6/50* (2006.01)
  *E21B 17/20* (2006.01)
  *G02B 6/44* (2006.01)
  *H02G 1/08* (2006.01)
  *E21B 47/00* (2012.01)

(52) U.S. Cl.
  CPC .......... *E21B 47/113* (2020.05); *E21B 47/135* (2020.05); *G02B 6/502* (2013.01); *E21B 47/00* (2013.01); *G02B 6/443* (2013.01); *G02B 6/4463* (2013.01); *H02G 1/085* (2013.01)

(58) Field of Classification Search
  CPC ....... E21B 47/00; G02B 6/502; G02B 6/4463; G02B 6/443; H02G 1/085
  See application file for complete search history.

(56) References Cited

U.S. PATENT DOCUMENTS

| | | | |
|---|---|---|---|
| 5,155,788 A | 10/1992 | Chapin et al. | |
| 5,992,250 A * | 11/1999 | Kluth | E21B 33/072 73/866.5 |
| 6,041,872 A * | 3/2000 | Holcomb | E21B 47/135 175/40 |
| 6,532,839 B1 | 3/2003 | Kluth et al. | |
| 6,561,488 B1 * | 5/2003 | Walker | E21B 47/135 254/134.4 |
| 8,496,858 B2 * | 7/2013 | Brenner | B65H 55/043 264/1.24 |
| 9,127,531 B2 * | 9/2015 | Maida | E21B 47/135 |
| 10,443,354 B2 | 10/2019 | Murphree et al. | |
| 2003/0172752 A1 | 9/2003 | Kluth et al. | |
| 2008/0236836 A1 | 10/2008 | Weng | |
| 2008/0272931 A1 | 11/2008 | Auzerais et al. | |
| 2011/0079401 A1 | 4/2011 | Gambier | |
| 2011/0094741 A1 | 4/2011 | Vigneaux et al. | |
| 2011/0240163 A1 | 10/2011 | Auzerais et al. | |
| 2011/0292763 A1 | 12/2011 | Coates et al. | |
| 2013/0025852 A1 | 1/2013 | Edmonstone et al. | |
| 2014/0196893 A1 | 7/2014 | Vigneaux | |
| 2014/0376332 A1 * | 12/2014 | Vigneaux | G01V 1/18 367/25 |
| 2016/0215578 A1 * | 7/2016 | Adnan | E21B 23/14 |
| 2017/0075017 A1 * | 3/2017 | Jasskelainen | G02B 6/4413 |

FOREIGN PATENT DOCUMENTS

| | | | |
|---|---|---|---|
| GB | 2119949 A | 11/1983 | |
| GB | 2349440 A | 11/2000 | |
| WO | WO-2007061932 A1 | 5/2007 | |
| WO | WO-2009/036897 A1 | 3/2009 | |
| WO | WO-2012012362 A2 | 1/2012 | |

OTHER PUBLICATIONS

Written Opinion PCT/ISA/237 for PCT International Application PCT/GB2017/052114 dated Sep. 27, 2017.
International Search Report PCT/ISA/210 for PCT International Application PCT/GB2016/052171 dated Oct. 5, 2016.
Written Opinion PCT/ISA/237 for PCT International Application PCT/GB2016/052171 dated Oct. 5, 2016.
International Preliminary Report on Patentability dated Jan. 31, 2019, issued in corresponding Application No. PCT/GB2017/052114.
Exam Report issued in respect of Australian Patent Application No. 2016293478 dated Nov. 16, 2020.
Exam Report issued in respect of European Patent Application No. 16741382 dated Dec. 10, 2019.
Exam Report issued in respect of European Patent Application No. 16741382 dated Nov. 8, 2018.
Advisory Action issued in respect of U.S. Appl. No. 15/745,151 dated Sep. 16, 2020.
Final Action issued in respect of U.S. Appl. No. 15/745,151 dated May 4, 2020.
Non-Final Action issued in respect of U.S. Appl. No. 15/745,151 dated Nov. 26, 2019.

* cited by examiner

OPTICAL FIBRE DEPLOYMENT

CROSS-REFERENCE TO RELATED APPLICATIONS

This application is a national phase under 35 U.S.C. § 371 of PCT International Application No. PCT/GB2017/052114 which has an international filing date of Jul. 18, 2017, which claims priority to PCT International Application No. PCT/GB2016/052171, which has an international filing date of Jul. 18, 2016, the entire contents of each of which are hereby incorporated by reference.

TECHNICAL FIELD

Described examples relate to deployment systems and methods for deploying optical fibres, for example, in a well.

BACKGROUND

Optical fibres are conventionally deployed in wellbores to facilitate sensing operations, such as distributed sensing operations including distributed temperature sensing (DTS), distributed pressure sensing (DPS) and distributed acoustic sensing (DAS). Optical fibres may also be used for data communication to/from a wellbore. In many cases the optical fibre is deployed as an integral component of a completion string, and thus may be classified as a permanent installation. In many cases the costs of including a permanently installed optical fibre system can be significant, and there are also concerns over the longevity of such permanently installed systems.

The present inventor has proposed, for example in WO 2017/009671, to deploy an optical fibre from a tool or device as the tool or device traverses a wellbore, and then use the deployed optical fibre in sensing and/or communication operations. Such an arrangement may permit the optical fibre to be deployed as required, and may avoid costs and reliability concerns with permanent installations.

There is a continuing need to deploy and use such optical fibre systems effectively, making such systems easier to deploy and install, reduce time and costs, and uncertainty, and the like.

This background serves only to set a scene to allow a skilled reader to better appreciate the following description. Therefore, none of the above discussion should necessarily be taken as an acknowledgement that that discussion is part of the state of the art or is common general knowledge. One or more aspects/embodiments of the invention may or may not address one or more of the background issues.

SUMMARY

In some examples, there is described a deployable device, comprising a deployable member. That deployable member may comprise an optical fibre. The device and methods of use may improve the ability with which to deploy an optical fibre, for example, making it easy to install, reduce time, cost and uncertainty during deployment, etc.

The deployable member may be stowed at the device in a first wound configuration, and arranged to be deployed from the device into a second unwound configuration. For example, the device may be deployed within a well, or the like. The deployable device may be configured such that, when unwound, the deployable member has a propensity to adhere to a wall within a well, or other such structure.

The deployable member may comprise or be provided with a tacky or adhesive outer surface along some or all of the length of the deployable member. The tacky or adhesive outer surface may have the propensity to adhere to the wall within the well.

The optical fibre may comprise a protective coating or cladding, e.g. a protective polymer coating or cladding. The protective coating or cladding may be configured to protect the optical fibre from damage and/or minimise optical losses from the sides of the fibre and/or to protect the optical fibre against environmental damage. Environmental damage of optical fibre may include hydrogen darkening or embrittlement that may otherwise be encountered under adverse environmental wellbore conditions such as high temperature. Such environmental damage and may otherwise result in the failure of the optical fibre. The protective coating may be or comprise a hard and/or solid coating. However, the optical fibre need not be provided with the protective coating or cladding.

At least a part or parts of the deployable member may comprise or be provided with an outer coating or layer, e.g. a tacky or adhesive outer coating or layer, which may form the tacky or adhesive outer surface. If the optical fibre has a protective coating or cladding, then the tacky or adhesive outer coating or layer may be a different or separate coating or layer to the protective coating or cladding of the optical fibre and may be provided on the outside of the protective coating or cladding on the optical fibre.

In some examples the outer coating or layer may comprise a fluidic material, such as a viscous material. The outer layer or coating may comprise a gel, colloid, fluid, viscous fluid, and/or the like. The outer coating or layer may comprise a grease, or other similar non-Newtonian fluid, such as a shear thickening fluid, shear thinning fluid or the like. The outer coating or layer may exhibit an NGLI number of between 000 to 6, for example between 0 and 5, such as between 2 and 4, for example 3. The outer coating or layer may optionally be or comprise one or more of: grease, wax, a paint, a tar, a polymeric material, a resin, a lacquer, a varnish, a high viscosity oil and/or the like. The outer coating or layer may comprise a phase change material (PCM), which may absorb heat energy without a substantial increase in its temperature. Any suitable PCM may be used including various forms of wax, including but not limited to petroleum based wax such as paraffin wax.

The viscosity of the outer coating or layer may be higher than 30 cP at 100° C., e.g. higher than 50 cP at 100° C. and may be higher than 150 cP at 100° C.

The deployable member may comprise or be provided with a plurality of different tacky or adhesive outer coating or layer sections, e.g. on different portions of the deployable member, for example along different axial length portions of the deployable member. The different outer coating or layer sections may be formed from different materials, or have a different weight fraction, or a different average chain length, and/or the like. The different outer coating or layer sections may have a different tackiness, adhesion and/or viscosity (e.g. at equivalent temperatures).

The different outer coating or layer sections may be arranged sequentially lengthwise along the deployable member in order of increasing tackiness, adhesion and/or viscosity (at equivalent temperatures and/or conditions). For example, as the deployable device transits deeper into the well, a portion of the deployable member having the least tacky, adhesive and/or viscous (at equivalent temperatures/conditions) outer coating or layer may be deployed and thereafter subsequent portions of the deployable member may be deployed in order of increasing tackiness, adhesion or viscosity (at equivalent temperatures/conditions) of their respective outer coatings or layers. In this way, the portions of the deployable member towards the surface, where temperature are likely to be lower, may have an outer coating or layer that is less viscous, tacky or adhesive (at equivalent temperature and conditions) than portions of the deployable member deployed further downhole, where temperatures are likely to be higher. In this way, the actual viscosity, tackiness or adhesion of the deployable member, in use, may be more uniform and/or consistent along its length, in view of the generally increasing temperature, pressure and/or other conditions with increasing depth downhole, which may act to reduce the actual viscosity, in use, of portions of the outer coating or layer that are deeper in the well.

In an alternative configuration, the different outer coating or layer sections may be arranged sequentially lengthwise along the deployable member in order of decreasing tackiness, adhesion and/or viscosity (at equivalent temperatures and/or conditions). For example, as the deployable device transits deeper into the well, a portion of the deployable member having the most tacky, adhesive and/or viscous (at equivalent temperatures/conditions) outer coating or layer may be deployed and thereafter one or more subsequent portions of the deployable member may be deployed in order of decreasing tackiness, adhesion or viscosity (at equivalent temperatures/conditions) of their respective outer coatings or layers. In this way, the portions of the deployable member at, proximate or towards the surface may have an outer coating or layer that is more viscous, tacky or adhesive (at equivalent temperature/conditions) than portions of the deployable member deployed further downhole. The portions of the deployable member towards the surface may have to support more weight than the portions of the deployable member further downhole. Furthermore, there may be more turbulence and/or more interference from other operations at or near the surface. Providing sections of coating at, proximate or towards the surface that are more tacky, adhesive and/or viscous than those further downhole may at least partly offset these effects and may more securely adhere the deployable member to the wall.

The deployable member may comprise or be provided with a magnetic material, which may comprise or be comprised in one or more magnets, or a magnetic coating and/or the like. The magnetic material may be configured to adhere to the wall within the well, e.g. a metallic wall of a liner, tubular, and/or the like. The magnetic material may provide the propensity to adhere to the wall of the well.

The deployable member may be wound on a bobbin. At least part of a coating material that will at least partly form the coating may be provided on the bobbin and the deployable member may be wound onto the bobbin in order to coat the deployable member, e.g. to coat the optical fibre or the protective coating thereof (if applicable), with the coating material, thereby forming the outer layer or coating. Different coating materials may be provided on different axially distributed sections of the bobbin, e.g. so as to coat the different coating materials onto different portions of the deployable member, e.g. which may be distributed lengthwise along of the deployable member.

At least some of the coating material that will at least partly form the coating may be provided in a dispenser or chamber. The deployable member may be configured to be deployed and/or wound through, adjacent or in contact with the dispenser or chamber, e.g. so that the coating material coats the deployable member whilst the deployable member is being dispensed and/or is being wound through, adjacent to or in contact with the dispenser or chamber.

The device may be a downhole device, and may be configured to transit along a well or bore, in use, e.g. such that the deployable member may become deployed within the well or bore. The device may be configured to deploy the deployable member along a deployment axis whilst the deployable device is transiting along the well. The device may transit the bore by action of gravity, by pumping, by tractoring or the like.

The deployable member may be spooled in, at or on the device, e.g. the deployable member may be provided in a spool. The spool may be supported within the device, such that the deployable member may be deployed from the device. The spool may be mounted within a cavity within the device. The device may comprise or define a cylindrical cavity. The device may define a fibre outlet. The device may comprise a guide, such as a funnel, to guide the fibre towards the outlet. In some examples the fibre outlet may comprise a store or a bath of the coating material, such that the optical fibre may become coated so as to form the outer coating or layer whilst exiting the device.

The device may further comprise a launch guide, for guiding the deployable member upon release, discharge or separation from the spool. The launch guide may permit the deployable member to be lifted clear of the spool, minimising drag of the deployable member thereacross the spool. The launch guide may traverse along the length of the spool, to follow the axial progression of a launch point of the deployable member from the spool.

The device may be configured to urge the deployable member towards and/or into contact with a wall, in use. For example, in some cases, the device may comprise a biasing system, which may be configured to force, deflect, guide, bias or urge the deployable member towards and/or into contact with the wall within the well, in use.

For example, the biasing system may comprise the fibre outlet and/or guide facing radially or obliquely outwardly from the device, e.g. relative to a direction in which the device transits the well or bore, in use. The biasing system may comprise a biasing member, such as a radially or obliquely extending biasing member, which may be configured to engage the deployable member after it has exited the device and deflect, force, guide or urge the deployable member radially outwardly or obliquely outwardly relative to a direction in which the device transits the well and/or towards the wall of the well, in use. The biasing member may comprise a resilient member and/or a pivoting member and/or the like.

The device may comprise one or more centralisers to facilitate appropriate positioning of the device within a bore. In some examples, the centralisers may be specifically configured to orientate the device during deployment such that the device passes through the wellbore with an oblique orientation relative to the axial bore of the well. In such a manner, the device/centralisers may be provided such that an exit of the device, from which the deployable member is deployed, is directed somewhat towards a well, e.g. rather than coaxially with the well.

The outlet of the device may comprise a resistance arrangement to provide a degree of resistance to exit of the fibre. For example, the outlet of the device may establish interference with the fibre.

In some examples the bore may defined within a pipeline, such as a surface or subsurface pipe line.

In some examples, the deployable member may comprise at least a first length and a second length, whereby the first and second lengths have different properties, such as different mechanical properties and/or different optical properties.

Features of the device may be derived from the description provided in accordance with any other aspect.

A second aspect of the present disclosure relates to a method of deploying a deployable member from a device within a well or downhole.

The deployable member may comprise at least one optical fibre. The method may comprise deploying the deployable member from a configuration in which it is stowed in the device in a first wound configuration into a second unwound configuration, e.g. within a well such that, when unwound, at least part of the deployable member is adhered to a wall, for example a wall within the well.

The method may comprise deploying at least a portion of the deployable member through a material to be coated so as to coat the deployable member, e.g. before or whilst the portion of the deployable member exits the device. The material to be coated may be provided in a dispenser or chamber of the device. The deployable member may be adhered to the wall within a well by the coating.

The method may comprise biasing the deployable member towards or into contact with the wall, e.g. using a biasing member, such as a radially or obliquely extending biasing member and/or by deploying the deployable member through a radially or obliquely extending guide and/or fibre outlet, which may be radially or obliquely extending relative to a transit direction of the device.

The deployable member may be or comprise the deployable member of the first aspect.

Features of the method may be derived from the description provided in accordance with any other aspect.

A third aspect of the present disclosure relates to a method of stowing or winding a length of deployable member that comprises an optical fibre to form a spool. The method may comprise providing a coating material and stowing, spooling or winding the deployable member around an axis of the spool such that at least part of the deployable member passes through or is in contact with the coating material.

Features of the method may be derived from the description provided in accordance with any other aspect.

Providing a deployable member that has a propensity to adhere to a wall within the well may allow the deployable member to be adhered to the wall simply and without complex additional apparatus or fixing operations. Adhering the deployable member against the wall may reduce the likelihood of it being damaged in use and/or may reduce the chance of it snagging or otherwise interfering with tools or other devices or operations being used in the well.

A fourth aspect of the present disclosure relates to a deployable device, comprising:
 a deployable member comprising an optical fibre;
 the deployable member being stowed at the device in a wound first configuration, and arranged to be deployed from the device to an unwound second configuration within a well; wherein
 the deployable member comprises at least a first length and a second length, the first and second lengths having different mechanical and/or optical properties.

The first and second lengths may have different mechanical and/or optical properties for use at different locations when deployed in the well.

The different mechanical properties may comprise differing tensile strengths. In this way, when deployed, the deployable member may have a first tensile strength at a first location in the well and a second tensile strength at a second location within a well, wherein the second tensile strength may be less than the first tensile strength.

The first length of the deployable member may comprise a different optical fibre and/or a different type of optical fibre to the optical fibre comprised in the second length. For example, the optical fibre comprised in the first length may be spliced, bonded or otherwise joined to the optical fibre in the second length. Alternatively, the same optical fibre may be comprised in both the first and/or second lengths of the deployable member.

The optical fibre(s) comprised in the first and/or second lengths of the deployable member may be or comprise any of the following types of optical fibre: conventional fibre, single mode fibre, multimode fibre, bend insensitive fibre, structural fibre, solid fibre, optical fibre comprising voids or cavities, such as closed voids or cavities, and/or the like.

The different optical properties may be or comprise a difference in the number of modes that can be carried or supported simultaneously by the optical fibre in the first length and the optical fibre in the second length. For example one of the first or second lengths may comprise a single mode optical fibre and the other of the first or second lengths may comprise a multi-mode optical fibre. The different optical properties may be or comprise other suitable optical properties or optical responses, such as a difference in refractive index, and/or a difference in optical response to one or more physical parameters (such as temperature, pressure, etc.) and/or the like. For example, one of the first or second lengths may comprise bend insensitive optical fibre or structural optical fibre and the other of the first or second lengths may comprise conventional optical fibre. In this way, an appropriate type of optical fibre may be provided at a corresponding part of the well. For example, a portion of the deployable member to be located at a bend in the well may be provided with bend insensitive optical fibre or a portion of the deployable member to be used as a sensor such as a pressure sensor may be provided with a structural optical fibre (e.g. a fibre comprising closed voids or cavities). However, special or non-conventional types of optical fibre, such as these, may be expensive or may have certain undesirable properties. As such, the portions of the deployable member where these special or non-conventional types of optical fibre are not required may be provided with a different type of optical fibre, such as conventional or standard optical fibre.

The first length of the deployable member may comprise a reinforcement structure such as a sheath or coating around the optical fibre, which may provide the different mechanical property to that of the second length of the deployable member. The reinforcement structure may comprise or be comprised in a strengthening layer.

The optical fibre may comprise a protective coating, such as a polymeric protective coating. The protective coating may be configured to protect the optical fibre from damage and/or reduce side leakage of light from the optical fibre. The reinforcement structure (e.g. the sheath or coating) may be different and/or separate to, and/or may be provided around, the protective coating of the optical fibre.

The reinforcement structure (e.g. sheath) may be or comprise a solid coating, and/or may comprise or be formed from a plastic, braided material, Kevlar, PTFE, Mylar, Nomex, Vectran, aramid fibres, binding resin, and/or the like. For example, one or more layer of Kevlar fibres may be applied, which may be provided for some or all of the optical fibre. For example a braided layer may be provided in the periphery of the optical fibre to improve the strength of the optical fibre and/or protect against mechanical stresses which may hinder the optical performance of the optical fibre. Other strengthening materials may be used in instead of or together with the Kevlar fibres.

The second length of the deployable member may have no reinforcement structure and/or may be provided with a second reinforcement structure having different mechanical properties to the reinforcement structure of the first length. The different mechanical properties of the second reinforcement structure may be the result of different materials, or different weaves, physical or structural arrangements, material or structural densities, layups, fibre orientations, and/or the like, relative to the reinforcement structure of the first length.

The section of optical fibre in the first length of the deployable member may have at least one different physical property to the section of optical fibre in the second length of the deployable member. For example, relative to the section of optical fibre in the second length of the deployable member, the optical fibre in the first length of the deployable member may be thicker, and/or may have a different material composition, e.g. being doped differently, or may have a different degree of crystallinity or may have been subjected to different processing, such as different annealing or other thermal or radiation treatment regimes, and/or the like.

The first length of the deployable member may comprise a connection region for fixing to a particular location, and the second length of the deployable member may be configured for deployment in a wellbore.

Features of the deployable device may be derived from the description provided in accordance with any other aspect.

A fifth aspect of the present disclosure relates to a method of producing the deployable device of the fourth aspect, the method comprising:
providing an optical fibre;
providing a first length of the optical fibre with a different mechanical and/or optical property to a second length of the optical fibre; and
stowing the deployable member at the device in a wound first configuration.

The different mechanical properties may comprise differing tensile strengths.

The method may comprise providing the first length of the optical fibre with a reinforcement structure such as a sheath or coating around the optical fibre, which may provide the different mechanical property to the second length of optical fibre.

The reinforcement structure may comprise a solid coating, and/or may comprise or be formed from a plastic, braided material, Kevlar, PTFE, Mylar, Nomex, Vectran, aramid fibres, binding resin, and/or the like.

The method may comprise leaving the second length of the optical fibre with no reinforcement structure. The method may comprise providing the second length of the optical fibre with a second reinforcement structure having different mechanical properties to the reinforcement structure of the first length of optical fibre.

The method may comprise producing or processing the first length of the optical fibre such that it has at least one different physical property to the second length of optical fibre. For example, the method may comprise making the first length optical fibre thicker, and/or having a different material composition, e.g. being doped differently, or having a different degree of crystallinity or having been subjected to different processing, such as different annealing or other thermal treatment regimes, and/or the like, relative to the second length of optical fibre.

The provision of different mechanical properties for different lengths or portions of optical fibre may cause different sections of the deployable member to be deployed at different rates. The provision of different mechanical properties for different lengths or portions of optical fibre may allow the deployable member to have different properties to suit different requirements at different locations within the well, in use.

Features of the method may be derived from the description provided in accordance with any other aspect.

The following are applicable to one or more or each of the above aspects. The deployable member may be stored in a first configuration prior to deployment, and arranged to deploy to a second configuration during deployment. The deployable member may be configured to permit sensing, such as distributed sensing, using the deployed optical fibre when in the second configuration. The deployable member may be or comprise a fibre optic line, which may be, or comprise, or be comprised in the optical fibre. The fibre optic line may allow for sensing of wellbore conditions (e.g. logging wellbore data). The fibre optic line may allow for distributed sensing of wellbore conditions.

The fibre optic line may establish data and/or signal communication between a first region of the line located within the wellbore and a surface device which may be operably connected to the fibre optic line. The data and/or signal communication may be a one way or two way communication.

The fibre optic line may allow establishing data and/or signal communication between a tool (e.g. disposable tool) and a surface device which may be operably connected to the fibre optic. The data and/or signal communication may be a one way or two way communication. For example, the surface device may include a light source. The light source may, by way of an example, comprise a laser and a surface interrogator of the type that may be used with fibre optic systems. For example, the light source may generate a light pulse at a desired frequency through the optic fibre which may then be backscattered to the surface interrogator. The surface interrogator may comprise software for analysing the received signals and deriving useful data such as the temperature, pressure, acoustics and the like at a region of the line deployed within the wellbore.

In some examples, the deployable device may comprise a light source (e.g. laser, interrogator, or the like) and be configured to analyse received signals (e.g. backscatter signals) at the deployable device.

The fibre optic line may be any suitable fibre optic line. The fibre optic line may be a single mode fibre optic line. The fibre optic line may be a multi-mode fibre optic line. The fibre optic line may be a bend insensitive optical fibre. The fibre optic line may be a structural optical fibre. The fibre optic line may be made of any suitable material. For example, the fibre core of the fibre optic line may be made of glass such as silica glass.

The fibre optic line and any related light source and interrogator modules may be any of the type commonly used for distributed sensing, such as distributed temperature sensing (DTS), distributed pressure sensing (DPS) and/or distributed acoustic sensing (DAS) applications, or the like.

In an optional example, the deployable member may be configured, when deployed, to permit detection of leaks, e.g. to "listen behind casing", such as between a casing and a cement sheath in cased cemented wellbores. The deployable member may be configured, when deployed, to permit measurement of sand production, flow allocation, or the like.

The length and diameter of the fibre optic line may vary depending upon the specific application. However, a small diameter fibre optic line may be used to reduce the overall volume and weight requirements of the wellbore device. According to an example, a "hair-thin" fibre optic line may be employed with or without a second stronger deployment line as may be needed depending upon the weight requirements of the application.

The wellbore device may be used, inter alia, in, or to deploy sensors for, distributed sensing, e.g. DTS, DPS and/or DAS applications. The wellbore device may be used in wellbore applications requiring activation of a particular tool at a precise depth location. The wellbore device may be used in wellbore applications for obtaining well data, for example, as a function of the well depth. The wellbore device may be used for logging wellbore data.

In some cases, the first configuration may be considered to be a wound or spooled configuration (e.g. bundled, coiled, etc.). At least part of the deployable member may be stored in the first configuration in a particular manner so as to impart or assist with linear deployment of optical fibre in the second configuration.

The device may be configured such that, when deployed to a second configuration, the deployable member provides one or more portions of optical fibre in the wellbore. The device may be configured to retain some of the deployable member with the device, when in the second configuration. In some examples, the device may comprise two or more device sections. The device sections may be configured to provide cascading deployment of the deployable member. Each section may be configured to retain some of the deployable member with device, when in the second configuration.

The deployable member may be stored in the first configuration as a winding such that the deployable member pays out from an inner surface of the winding, when deployed.

In some examples, the device may be configured to permit controlled deployment of the device in the well. For example, the deployable device may comprise a friction device. Such a friction device may be configured to impart a force to the deployable member, when being deployed. In some cases, the force may be selective so as to selectively control deployment.

The deployable member may comprise two or more different coating characteristics. In some examples, the different coating characteristics may be used to provide different deployment characteristics of the device in a wellbore.

The deployable member may be configured to permit distributed sensing using the deployed optical fibre when in the second configuration.

The device may comprise a tool for deployment in the wellbore, such as a drift, which may comprise an imaging system, or the like. The drift may comprise one or more sensors configured to measure well conditions. The sensors may be configured to communicate sensed conditions using the optical fibre of the deployable member.

The deployable member may comprise the optical fibre for use in a distributed sensing arrangement. Such an arrangement may comprise a device as described above in relation to any of the above aspects, and an optical fibre module connected to the optical fibre for providing distributed sensing.

In those cases, the optical fibre module may be in operative communication with the optical fibre of the deployable member. For example, the optical fibre module may be configured to provide distributed acoustic sensing using the optical fibre of the deployable member.

The device may be deployed in the well by gravity, fluid pumping or tractoring.

According to an aspect of the present disclosure is a deployable member comprising an optical fibre, the deployable member being comprised in, and/or configured for deployment from, a deployable device. The deployable member may be stowed or stowable at the device in a first wound configuration and may be arranged to be deployed from the device to a second unwound configuration within a well. In examples, the deployable device may be configured such that, when unwound, the deployable member has a propensity to adhere to a wall within the well. In examples, the deployable member may comprise at least a first length and second length, the first and second lengths having different mechanical and/or optical properties.

Features of the deployable member may be derived from the description provided in accordance with any other aspect.

According to an aspect of the present disclosure is a method of performing distributed sensing using the deployable device comprising the deployable member including an optical fibre as described above in relation to the first aspect or the fourth aspect. The method may comprise deploying the optical fibre in the well, e.g. adhered to a wall in the well, prior to performing distributed sensing.

The method may comprise sensing in order to assess one or more of sand production, well integrity (e.g. assessing leaks), flow allocation, offset seismic applications (e.g. sensing vibrations or the like from another well).

The method may comprise deploying the deployable device after previously installed completion or intervention procedures installing other sensors. The method may comprise deploying in a producing or previously producing well, or indeed injector well. The method may comprise deploying in a well having a pre-existing optical fibre installed. The method may comprise calibrating or checking on one optical fibre system with the other.

According to an aspect of the present disclosure is a container or dispenser system comprising the deployable device of the first aspect. The deployable member of the deployable device may be spooled. The container or dispenser system may comprise or define a chamber and at least part of the deployable member may be provided in the chamber. The container or dispenser system may comprise a fibre outlet through which the deployable member is deployable out of the chamber.

Aspects of the described systems and methods may help reduce deployment time and costs, and/or maintaining or improving packaging of such systems.

It should be understood that the individual features and/or combinations of features defined above in accordance with any aspect of the present invention or below in relation to any specific embodiment of the invention may be utilised, either separately and individually, alone or in combination with any other defined feature, in any other aspect or embodiment of the invention.

Furthermore, the present invention is intended to cover apparatus configured to perform any feature described herein in relation to a method and/or a method of using or producing, using or manufacturing any apparatus feature described herein.

BRIEF DESCRIPTION OF THE FIGURES

A description is now given, by way of example only, with reference to the accompanying drawings, in which.

DETAILED DESCRIPTION OF THE DRAWINGS

There is a need to improve the way in which deployable members are deployed downhole and potentially in other such environments. Such deployable members may comprise optical fibres.

In some examples described below, the deployable members and related devices are configured such that members, being deployed, have a propensity to adhere to a wall within a well. In other similar words, the deployable members may be fixed to a wall, when deployed. As such, after deployment, the optical fibres may have been suitably deployed along the length of a wellbore.

Some exemplary mechanisms for providing the propensity to adhere to the wall include the provision of a tacky or adhesive outer coating or layer on an outer surface of at least part of the deployable member. The functional coating may be applied to the entire length of the deployable member, or otherwise applied at discrete sections or lengths. In some examples, any functional coating may be provided periodically along the length of the wellbore. Of course, other mechanisms may additionally or alternatively be utilised in order to provide a propensity for the deployable member to adhere to a wall, including providing a magnetic material on or in the deployable member, for example. Additionally, or indeed alternatively, the device may be configured to bias the deployable member towards a wall, during deployment. For example, a biasing system for biasing the deployable member towards and/or into contact with the wall can be provided. It will be appreciated that in some circumstance, environmental conditions at the wall of a wellbore may additionally assist in retaining the deployable member at the wall.

In certain situations, having the deployable member, e.g. comprising an optical fibre, adhered to a wall can reduce the risk of damage to the deployable member and/or minimise the risk of interference with other devices, components or operations within the well. In certain applications, having the optical fibre on or adjacent the wall can lead to improved operability of the optical fibre, e.g. in certain sensing operations (e.g. leak detection).

In some examples described below, different portions, e.g. lengths, of the deployable member are provided with different properties. The deployable member may be specifically configured with different properties for expected well conditions. In other similar words, in some examples a first length of deployable member may have first particular properties (e.g. mechanical and/or optical properties), while another second length may have second—and different— properties to the first. An example may be different tensile strengths, abrasion resistance, or indeed other specifically-provided mechanical properties, for example, that affect optical or sensing performance, or the like. In these ways, different properties of the deployable member can be provided to most suit different locations or operations in the well.

Aspects of the present disclosure relate to a spool of deployable member, in this example, comprising an optical fibre. The spool of optical fibre is mounted in a device such that the fibre may be deployed from the device. In use, the device transits through a well, such that the fibre becomes deployed within the well. The device can be used in many applications or environments. For the purposes of the present description the device is for use within a wellbore, but it should be recognised that this is merely exemplary. For example, in some circumstances, it may be appropriate to deploy the device in an annulus, or the like. It should be understood that the drawings presented are not provided to scale, and may not reflect actual dimensions, ratios, angles, number of features and the like.

Figure 1:
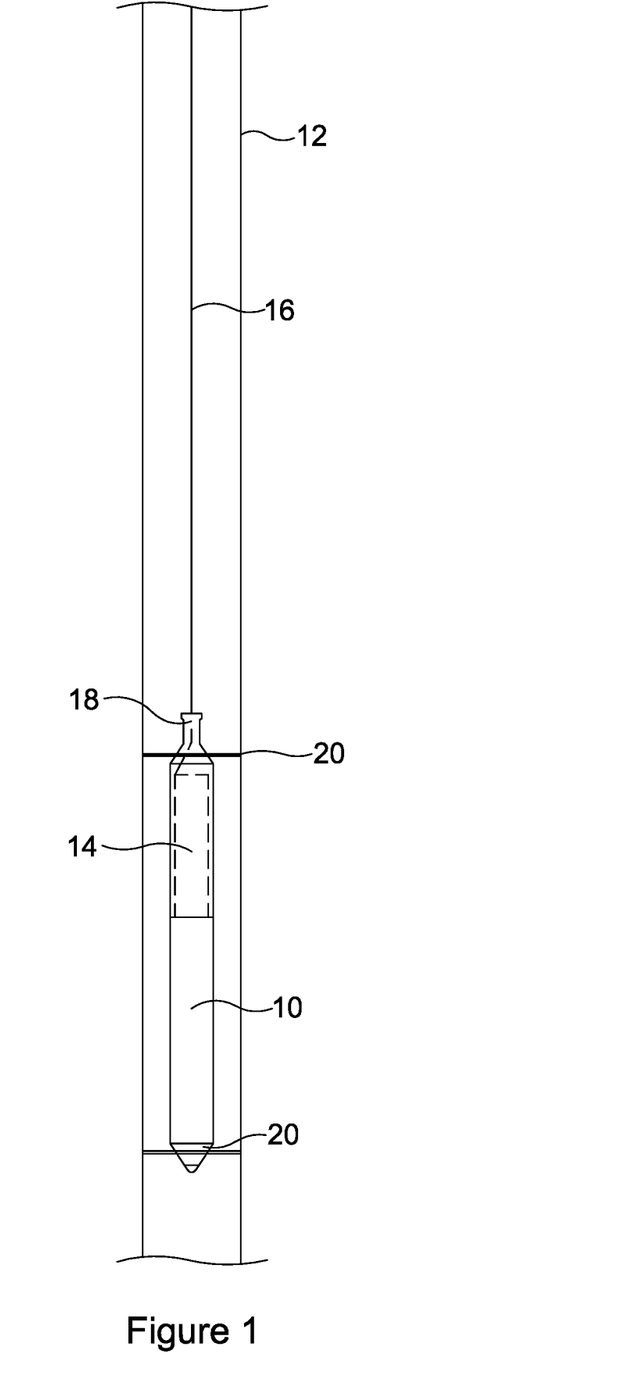
FIG. 1 is a diagrammatic illustration of a device being deployed through a well.

FIG. 1 is a diagrammatic illustration of a device 10 deployed within a wellbore 12. The device 10 includes a spool 14 of deployable member—here comprising optical fibre 16—such that, as the device 10 traverses the wellbore 12, the member/fibre 16 is deployed from an exit 18 at the trailing end of the device 10. To that end, the deployable member may be considered to be stowed at the device 10 in a first wound configuration, and arranged to be deployed from the device 10 into a second unwound configuration within a well.

The fibre 16 may be used during or after deployment for multiple applications, such as for communication. In some examples the fibre 16 may be used for distributed sensing within the wellbore 12, such as distributed temperate sensing (DTS), distributed pressure sensing (DPS), distributed acoustic sensing (DAS), or the like.

Figure 2:
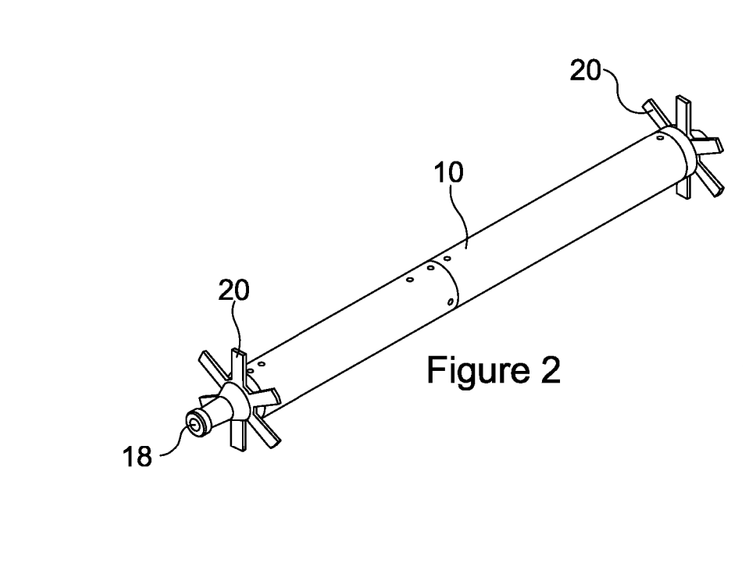
FIG. 2 is a perspective view of the device of FIG. 1.

A perspective view of the device 10 is provided in FIG. 2, illustrated in the direction of the exit 18 at the trailing end thereof. The device 10 is generally cylindrical in form, and in the present example includes centralising elements 20 at opposing ends thereof for facilitating centralisation of the device 10 in the wellbore 12 (FIG. 1).

Figure 3:
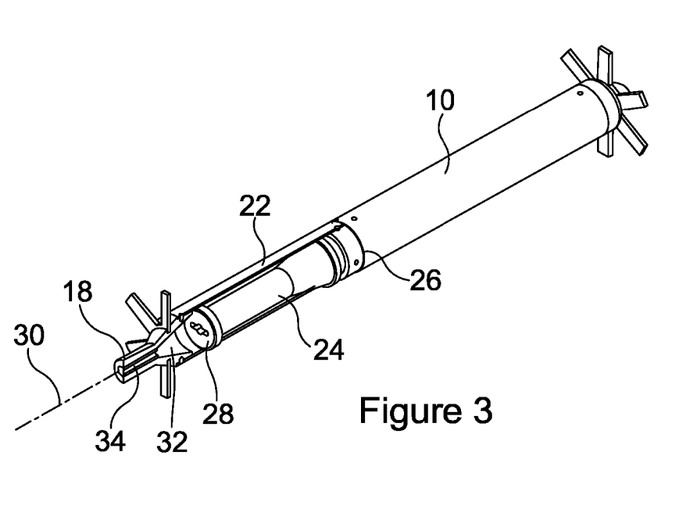
FIG. 3 is a part sectional view of the device of FIG. 2, shown in perspective view.
Figure 4:
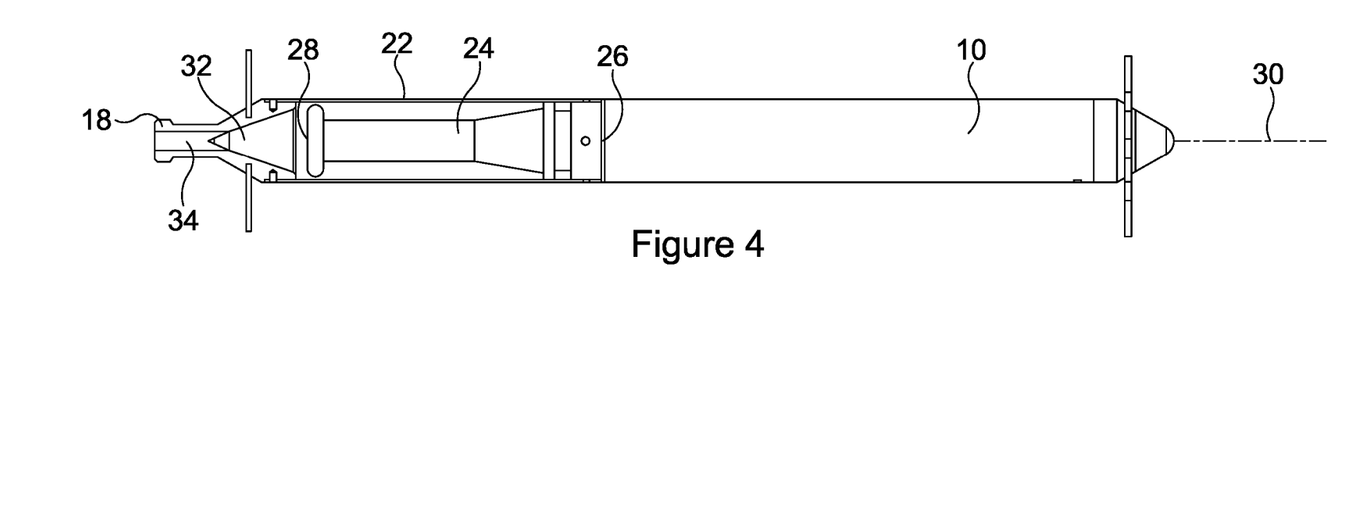
FIG. 4 is a part sectional view of the device, shown in side elevation.

FIGS. 3 and 4 provide alternative perspective views of the device 10, with a cavity region 22 shown in cross-section, wherein the cavity region 22 accommodates the spool of optical fibre 16. In this respect FIGS. 3 and 4 illustrate a bobbin 24 of the spool, with no fibre wound thereon for clarity purposes. The bobbin 24 is mounted within the cavity 22 in cantilever form such that the bobbin 24 defines a fixed or proximal end 26 and a free or distal end 28, and arranged to be coaxial with the axis 30 of the device 10.

The device 10 includes an internal funnel 32 which functions to guide fibre despooled from the bobbin 24 towards the exit 18. The exit 18 includes a throughbore 34 which is dimensioned to a similar diameter as the fibre, and in some examples the bore 34 may provide a degree of resistance to fibre passing therethrough. This may assist to control the rate of fibre deployment. In some examples, the bore 34 can extend obliquely, e.g. to help bias or guide the optical fibre 16 towards a wall within the wellbore 12. In some examples a volume of grease or similar material may be provided within the cavity 22, for example within the internal funnel 32. Such grease may become coated on a fibre during deployment from the device 10. The grease may function to provide a degree of resistance to the deployment of the fibre. In some examples, the grease (or indeed another coating) may be selected so as to permit the fibre to stick to a wall of the wellbore 12, as will be described in more detail below. In some examples, the grease or other such coating may be selected so as to functionally provide both some resistance to deployment, and adhesion to the wellbore when deployed.

Figure 5:
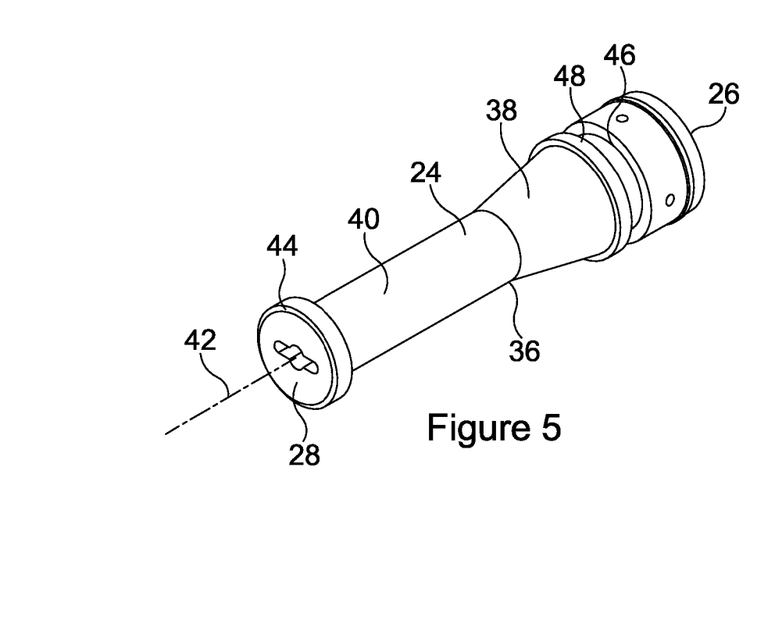
FIG. 5 is a perspective view of a bobbin of the device of FIG. 2.

FIG. 5 provides a perspective view of the bobbin 24 removed from the device 10. The bobbin 24 includes a winding surface 36 which has a conical portion 38 and an adjacent cylindrical portion 40 for receiving fibre thereon, wherein the conical portion 38 is located towards the proximal end 26 of the bobbin 24 and the cylindrical portion 40 is located towards the distal end 28. The conical portion 38 defines a tapered surface relative to the axis 42 of the bobbin 24, whereas the cylindrical portion 40 defines a parallel surface relative to the bobbin axis 42.

The bobbin 24 further comprises an annular lip 44 at the distal end 28. The annular lip 44 assists during despooling of fibre from the bobbin 24.

Figure 6:
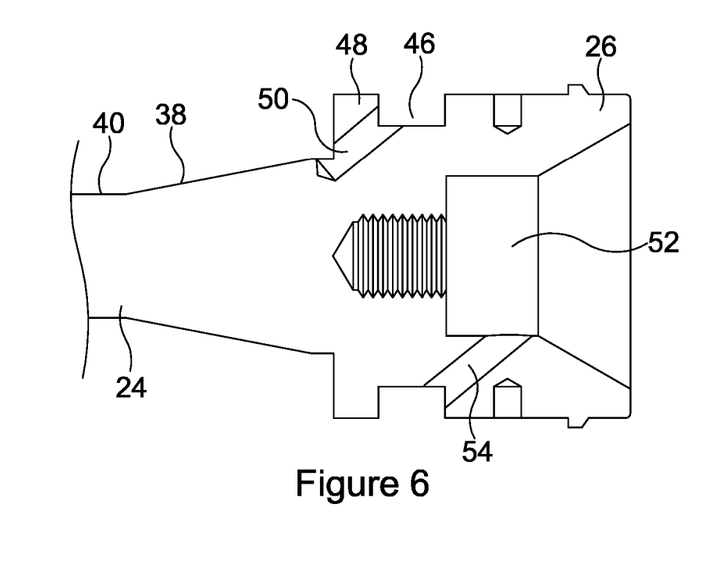
FIG. 6 is a sectional view of an end region of the bobbin of FIG. 5.

The bobbin 24 also includes an annular recess 46 at the proximal end 26, separated from the conical portion 38 by an annular lip 48. The annular recess 46 functions as a storage area to store one or more turn of optical fibre, such that an end of said optical fibre is readily accessible following winding onto the bobbin 24, facilitating any testing operations and the like prior to being installed in the device 10. FIG. 6 is a cross-sectional view of the bobbin 24 in the region of the proximal end 26, illustrating the form of the annular recess 46 and lip 48. A feed-through bore 50 is provided to allow fibre to pass from the recess 46 to the conical portion 38 of the winding surface 36.

In the present example the bobbin 24 includes an internal pocket 52 extending into the proximal end 26, wherein a further feed-through bore 54 is provided to facilitate passage of fibre from the annular recess 46 into the pocket 52. The pocket 52 may accommodate components or apparatus, such as one or more sensors, a light source, a light receiver, a controller, and the like. Fibre wound on the bobbin 24 may be connected to a component within the pocket 52.

Figure 7:
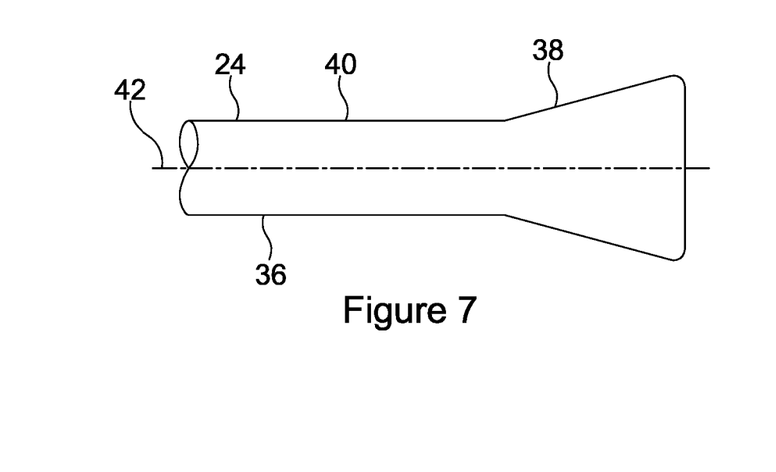
FIGS. 7 to 9 provide sequential stages in winding an optical fibre on the bobbin of FIG. 5 to form a spool.
Figure 8:
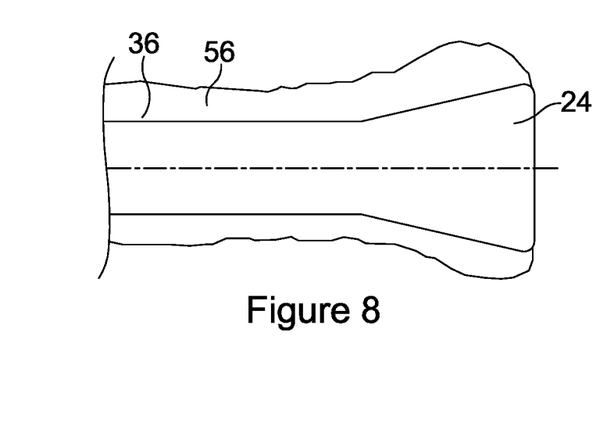

A description of a sequence of winding a length of optical fibre will now be described with reference to FIGS. 7 to 9. Referring initially to FIG. 7, the bobbin 24 is illustrated in simplified form, showing the conical and cylindrical portions 38, 40 of the winding surface 36, and the bobbin axis 42. In FIG. 8 grease 56 is applied over the winding surface 36. Optical fibre wound onto the bobbin 24 will be wound through the grease 56, such that the optical fibre becomes coated with the grease 56. Such an arrangement may facilitate easier coating of the fibre 16, rather than, for example, stripping the complete length of the fibre through a grease bath, although such an example alternative or supplemental way of applying grease may still be used. Any suitable grease may be used, or indeed any alternative coating material as required. For example, as indicated above, the grease 56 may be provided in the funnel 32 such that the fibre 16 gets coated with the grease 56 as it is deployed past the funnel 32 through the exit 18.

It will be appreciated that where at least a portion of the optical fibre may comprise or be provided with a coating, it may indeed be the case that the coating could in some examples be considered an additional coating. That is to say that the coating may be provided in addition to any plastic coating, or the like, that may be provided with commercially available bare optical fibre. In that regard, the coating may be considered to be a functional coating, e.g. an additional functional coating for use when winding and/or deploying in a bore, or the like.

Figure 9:
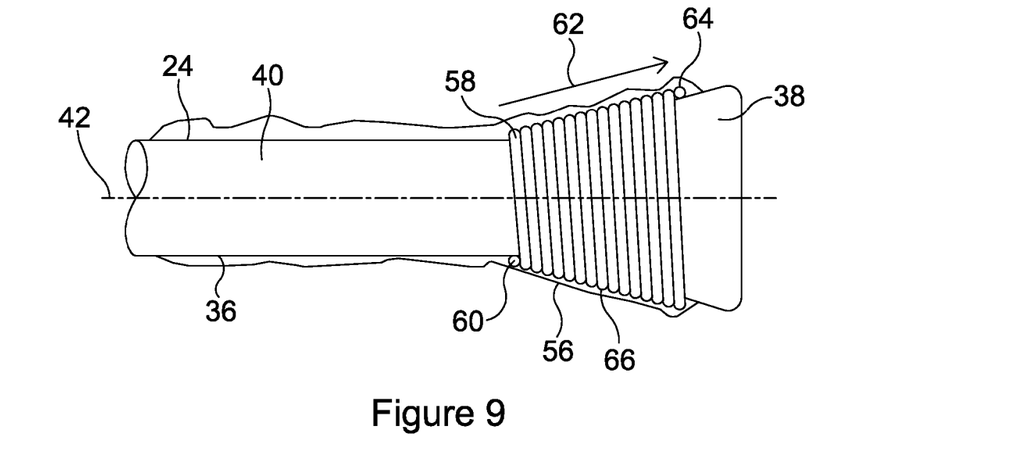

The initial winding stage of an optical fibre 16 is illustrated in FIG. 9. Furthermore, with brief reference to FIG. 6, an end region of the fibre 16 may first be extended into the annular recess 46 (not shown in FIG. 9) before winding begins. Fibre extending from the recess 46 may extend along the conical portion 38 of the winding surface, to a winding start point 60 at the interface between the conical portion 38 and cylindrical portion 40 of the winding surface 36.

The fibre 16 is then wound in a first axial direction, indicated by arrow 62, relative to the bobbin axis 42 (which may also define a spool axis) to form a number of adjacent individual turns or wraps, at a steep winding pitch which provides the adjacent wraps in contact with each other (i.e., a closed winding pitch). In the present case the first axial direction is such that the fibre 16 is added to the bobbin 24 in an upslope direction of the conical portion 38. During the winding, the fibre 16 is coated in the grease 56.

Figure 10:
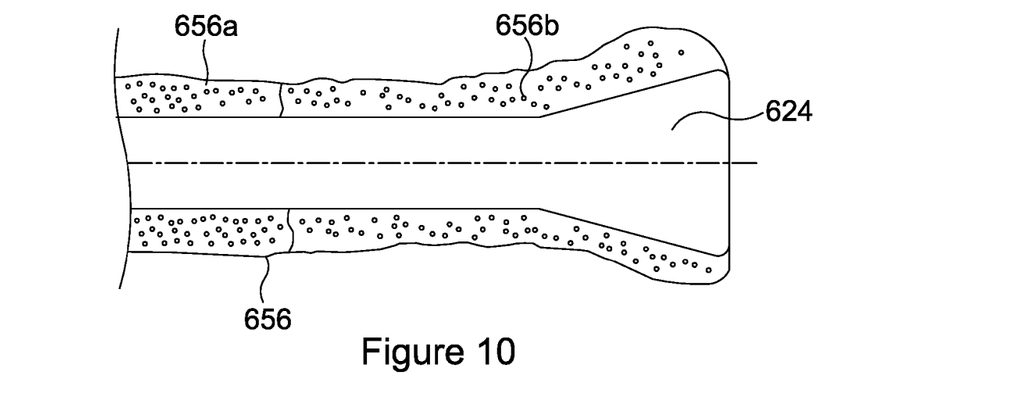
FIG. 10 illustrates an alternative bobbin to that shown in FIG. 8.

The nature of a fibre winding arrangement as described above may facilitate an efficient manner of applying a different coating between the different axial portions of the fibre. For example, FIG. 10 diagrammatically illustrates a portion of a bobbin 624 which is similar to bobbin 24 first shown in FIG. 3. In this example, before any fibre is wound thereon, a material, such as grease 656 is applied on the outer surface of the bobbin 624, in the same manner shown in FIG. 8. However, in this case a first type of grease 656*a* is provided over a first axial length of the bobbin 624, and a second type of grease 656*b* is provided over a second axial length of the bobbin. The different types of grease may be differentiated by viscosity, NGLI number or the like. In this way, as fibre is wound onto the bobbin, different axial portions or essentially lengths will become coated with the different types of grease 656*a*, 656*b*.

In this way, a portion of the optical fibre that may be deployed deeper in the well (i.e. further from surface), in use, may be coated with a grease 656*b* that has a higher viscosity (at an equivalent temperature and other conditions) than the grease 656*a* that coats a different portion of the optical fibre, which may be expected to be deployed at a shallower location in the well, in use. In this way, the coating, e.g. grease 656*b* on the portion or indeed length of the optical fibre that is deployed deeper in the well can maintain a similar, or comparable, tackiness and adhesion to grease 656*a* on the different portion of the optical fibre that is expected to be deployed closer to surface, even though the well conditions, such as temperatures, may generally be different further downhole. Of course, in some examples, the device may be configured such that multiple different greases (or other such coatings) are used specifically to complement the expected profile of environmental conditions experienced by the deployable member, as it is being deployed in the well.

Figure 11:
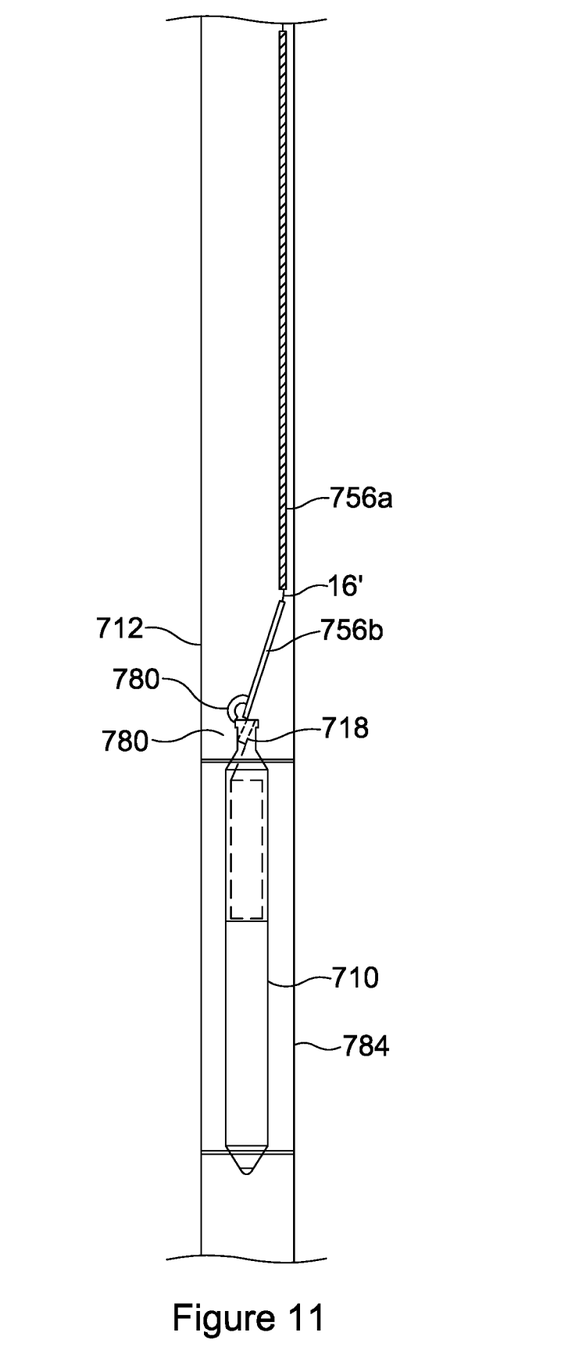
FIG. 11 illustrates a device that includes a spool of optical fibre, with said fibre deployed from the device in a wellbore, wherein the device includes a biasing system for biasing the optical fibre into contact with a wall of the well.

FIG. 11 shows a further example in which an optical fibre 16' is deployed in a well. In this example, different coatings may also be provided, e.g. different greases 756*a*, 756*b*, at different sections along its length, e.g. as described above in relation to FIG. 10.

In any event, the optical fibre 16' is deployed from a device 710 that transits a wellbore 712. Here, the device 10 is provided with a biasing system 780. The biasing system 780 is configured to force the optical fibre 16' radially outwardly or at least obliquely outwardly from the direction of transit of the device 710 down the wellbore 712, which is also co-incident with a longitudinal axis of the wellbore.

In this example, the biasing system 780 comprises an obliquely angled exit 718 through which the optical fibre 16' exits the device 710. The biasing system 780 also comprises a guide 782 that further guides the optical fibre 16' from the exit 718 towards and onto a wall 784 of the wellbore 712. In this way, the optical fibre 16' can be beneficially passively adhered to the wall 784 of the wellbore 712 with the minimum of extra components or complexity whilst the device 710 transits down the wellbore without requiring any operator intervention or additional moving mechanical operations.

Although a specific example of a biasing system 780 is given in this example, it will be appreciated that other biasing mechanisms could be used, e.g. resilient, pivoting and/or spring loaded members configured to push the optical fibre 16' towards or onto the wall or other suitable means that would be apparent to a skilled person. In some example, the device may be configured such that the centralisers facilitate appropriate positioning of the device within a bore in order to assist with urging the deployable member toward the well. So, for example, the centralisers may be specifically configured to orientate the device 10 during deployment such that the device 10 passes through the wellbore with an oblique orientation relative to the axial bore of the well. In such a manner, the device/centralisers may be provided such that an exit of the device 10, from which the deployable member is deployed, is directed somewhat towards a well, e.g. rather than coaxially with the well. This may be provided as an alternative or in addition to a specific biasing system, guide, etc.

Figure 12:
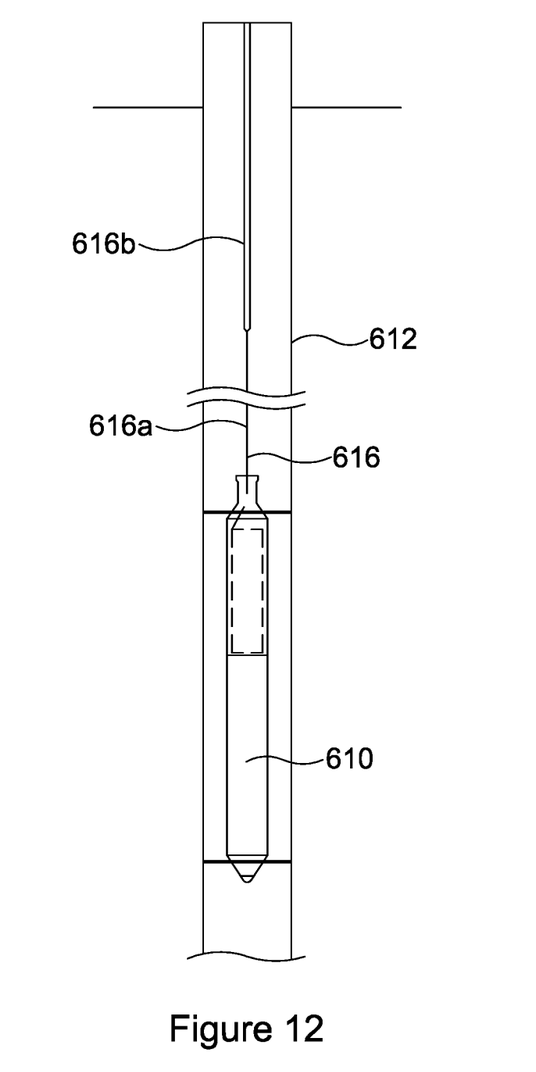
FIG. 12 illustrates a device that includes a spool of optical fibre, with said fibre deployed from the device in a wellbore, wherein the fibre includes different properties in different axial sections.

FIG. 12 diagrammatically illustrates a device 610 traversing a wellbore 612 while deploying a fibre 616 therefrom such that the fibre 616 is installed in the wellbore 612. In some examples the fibre 616 may define separate axial portions 616a, 616b which comprise or exhibit different properties. In some examples a different fibre type may be provided in each portion 616a, 616b. For example, the different fibre type may comprise a different thickness of fibre, or a different fibre composition, e.g. material or dopant composition, or a different crystallinity, or the different portions 616a, 616b may be produced or processed differently, e.g. with different annealing and/or quenching, in order to provide each portion 616a, 616b with different properties. Optionally, each portion 616a, 616b may comprise a different optical fibre and/or type of optical fibre, which are spliced, bonded or otherwise fixed together. A different coating or sheath may be applied on the different fibre portions 616a, 616b to provide the different sections 616a, 616b with different properties. The different properties applied along the fibre 616 may be provided to accommodate the particular environment in which the fibre 616 is deployed. For example, additional protection to the fibre 616 may be preferred in an upper region (portion 616b) of the fibre, etc.

Although differences in various mechanical properties between the portions 616a, 616b of optical fibre are described above, the differences in properties could additionally or alternatively comprise differences in optical properties or optical response. For example, the different portions 616a, 616b may comprise different types of optical fibre, such as different types of optical fibre selected from conventional fibre, single mode fibre, multi-mode fibre, bend insensitive fibre, structural fibre, solid fibre, optical fibre comprising voids or cavities, such as closed voids or cavities, and/or the like. Although various types of optical fibre are listed above, it will be appreciated that other types of optical fibre could be used, depending on the particular application.

In an example, the different optical properties include a difference in the number of modes that can be carried or supported simultaneously by the first portion 616a of optical fibre (e.g. which could comprise a single mode fibre) relative to the second portion 616b of optical fibre (e.g. which could comprise a multi-mode fibre). In another example, the first portion 616a could comprise bend insensitive optical fibre or structural optical fibre and the second portion 616b could comprise conventional optical fibre. In this way, an appropriate type of optical fibre may be provided at a corresponding part of the well.

In an example, as is shown in FIG. 12, a first portion or length of fibre 616a may be provided with an outer sheath, or the like, in order to increase comparatively the strength of the deployable member at that portion 616a, relative to the second portion 616b. To that end, the cross-section of the deployable member at the first portion may be greater than at other lengths. In some examples, the second portion 616b may essentially be a bare fibre, with no or minimal external coatings. It will be appreciated that provided a length of greater strength may allow the device to be deployed initially from a fixed location while minimising the risk of fracture of the deployable member, and at the same time maximise the opportunity to store sufficient length of fibre at the device—in so far as it may be preferable to minimise any coatings or sheaths on the deployable member.

It will readily be appreciated that in alternative examples, different properties of deployable member may be used specifically to complement the expected conditions experienced by the deployable member, as it is deployed in the well. So, for example, an outer sheath or jacket may be provided with portions of deployable member that are expected to pass through restrictions, or areas of damage/buckling, etc. In some examples, different sheaths or coatings may be used to improve strength and/or abrasion characteristics at different locations in the well.

It should be understood that the examples provided are merely exemplary of the present disclosure, and that various modifications may be made thereto.

The invention claimed is:

1. A deployable device, comprising:
    a deployable member comprising an optical fibre and provided with a tacky or adhesive outer surface along some or all of a length of the deployable member;
    the deployable member being stowed at the device in a first wound configuration, and arranged to be deployed from the device into a second unwound configuration within a well; wherein
    the deployable device is configured such that, when unwound, the deployable member has a propensity to adhere to a wall within the well by virtue of the tacky or adhesive outer surface thereof,
    at least part of the deployable member comprises a tacky or adhesive outer coating or layer that forms the tacky or adhesive outer surface of the deployable member, and
    the deployable member comprises a plurality of sections of different tacky or adhesive outer coatings or layers along different axial length portions of the deployable member.

2. The deployable device according to claim 1, wherein the outer coating or layer comprises a grease.

3. The deployable device according to claim 1, wherein the different tacky or adhesive outer coatings or layers have at least one of a different tackiness, a different adhesion and a different viscosity at equivalent temperatures.

4. The deployable device according to claim 3, wherein the different tacky or adhesive outer coatings or layers are arranged sequentially lengthwise along the deployable member in order of increasing or decreasing tackiness, adhesion and/or viscosity at equivalent temperatures and/or conditions.

5. The deployable device according to claim 4, wherein a portion of the deployable member having the least tacky, adhesive and/or viscous coating or layer at equivalent temperatures/conditions is deployable furthest uphole in use and subsequent portions of the deployable member having the different coatings or layers configured to be deployed further downhole in order of increasing tackiness, adhesion or viscosity at equivalent temperatures/conditions of the coating or layer.

6. The deployable device according to claim 4, wherein a portion of the deployable member having the most tacky, adhesive and/or viscous coating or layer at equivalent temperatures/conditions is deployable furthest uphole in use and subsequent portions of the deployable member having the different coatings or layers configured to be deployed further downhole in order of decreasing tackiness, adhesion or viscosity at equivalent temperatures/conditions of the coating or layer.

7. The deployable device according to claim 1, wherein the different outer coatings or layers at least one of are formed from different materials, have a different weight fraction, and have a different average chain length.

8. The deployable device according to claim 1, wherein the deployable member is provided with a magnetic material.

9. The deployable device according to claim 1, comprising a biasing system configured to bias the deployable member towards the wall within the well.

10. The deployable device according to claim 9, wherein the biasing system comprises at least one of:
a fibre outlet facing radially or obliquely from the device relative to a direction in which the device transits the well or bore; and
a biasing member configured to engage the deployable member after it has exited the device and deflect the deployable member towards the wall of the well.

11. A method for deploying a deployable member that comprises an optical fibre from a device within a well or downhole, the deployable member provided with a tacky or adhesive outer surface along some or all of a length of the deployable member, wherein at least part of the deployable member comprises a tacky or adhesive outer coating or layer that forms the tacky or adhesive outer surface of the deployable member, and wherein the deployable member comprises a plurality of sections of different tacky or adhesive outer coatings or layers along different axial length portions of the deployable member, the method comprising deploying the deployable member from a configuration in which it is stowed in the device in a first wound configuration into a second unwound configuration within the well such that, when unwound, at least part of the deployable member is adhered to a wall within the well.

12. The method according to claim 11, comprising at least one of:
deploying at least part of the deployable member through a coating material so as to coat the deployable member; and
biasing the deployable member towards or into contact with the wall using a radially or obliquely extending biasing member and/or by deploying the deployable member through a radially or obliquely extending guide and/or fibre outlet.

13. The method according to claim 11, comprising initially stowing a length of the deployable member in the first wound configuration on a spool by providing a coating material and winding the deployable member around an axis of the spool such that at least part of the deployable member passes through or is in contact with the coating material.

14. A deployable device, comprising:
a deployable member comprising an optical fibre;
the deployable member being stowed at the device in a wound first configuration, and arranged to be deployed from the device to an unwound second configuration within a well; wherein
the deployable member comprises at least a first length and second length, the first and second lengths having at least one of different mechanical and different optical properties, wherein the different mechanical properties comprise differing tensile strengths.

15. The deployable device according to claim 14, wherein a first length of the deployable member comprises a first reinforcement structure comprising a sheath or coating around the optical fibre, which at least partly provides the at least one mechanical property of the first length of optical fibre that is different to that of a second length of optical fibre.

16. The deployable device according to claim 15, wherein:
the second length of the deployable member has no reinforcement structure, or
the second length of the deployable member is provided with a second reinforcement structure having different mechanical properties to the reinforcement structure of the first length.

17. The deployable device according to claim 14, wherein the optical fibre in a first length of the deployable member has at least one different physical property to the optical fibre in a second length of the deployable member.

18. The deployable device according to claim 14, wherein the different optical properties comprise at least one of:
a difference in the number of modes that can be carried or supported simultaneously by the optical fibre;
a difference in refractive index of the optical fibre; and
a difference in optical response by the optical fibre to one or more physical parameters.

19. The deployable device according to claim 18, wherein a first length of the deployable member and a second length of the deployable member each comprise a different type of optical fibre, selected from the following types: conventional fibre, single mode fibre, multimode fibre, bend insensitive fibre, structural fibre, solid fibre, and optical fibre comprising voids or cavities.

* * * * *